(12) United States Patent
Yasnogorodskiy et al.

(10) Patent No.: US 10,569,202 B1
(45) Date of Patent: Feb. 25, 2020

(54) TRANSMISSION FILTER

(71) Applicant: Ford Global Technologies, LLC, Dearborn, MI (US)

(72) Inventors: Vladimir Yasnogorodskiy, Sterling Heights, MI (US); David P. Aeschliman, Whitmore Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/265,242

(22) Filed: Feb. 1, 2019

(51) Int. Cl.
| | | |
|---|---|---|
| *B01D 35/153* | (2006.01) |
| *B01D 35/157* | (2006.01) |
| *B01D 35/00* | (2006.01) |
| *F16H 57/04* | (2010.01) |

(52) U.S. Cl.
CPC ......... *B01D 35/153* (2013.01); *B01D 35/005* (2013.01); *B01D 35/1573* (2013.01); *F16H 57/0404* (2013.01); *F16H 57/0443* (2013.01)

(58) Field of Classification Search
CPC ............. F16H 57/0404; F16H 57/0443; B01D 35/005; B01D 35/153; B01D 35/1573; F01M 11/064; F01M 11/065
See application file for complete search history.

(56) References Cited

U.S. PATENT DOCUMENTS 7,240,756 B2   7/2007   Derby

FOREIGN PATENT DOCUMENTS

| DE | 102010002151 A1 | | 8/2011 |
|---|---|---|---|
| JP | 02086908 A | * | 3/1990 |
| JP | 2005328835 A | | 12/2005 |
| KR | 20030054005 A | | 7/2003 |

* cited by examiner

*Primary Examiner* — Terry K Cecil
(74) *Attorney, Agent, or Firm* — David Kelley; Brooks Kushman, P.C.

(57) ABSTRACT

A transmission filter includes a baffle with a valve. The baffle defines front and rear openings. When a vehicle climbs or descends a hill, the valve moves in response to the weight of fluid on a higher side of the baffle. The valve prevents flow from the higher of the front and rear openings preventing air ingestion into the filter.

12 Claims, 8 Drawing Sheets

TRANSMISSION FILTER

TECHNICAL FIELD

This disclosure relates to the field of transmission systems. More particularly, the disclosure pertains to a transmission filter designed to prevent air ingestion when a vehicle is accelerating, decelerating, or on a grade.

BACKGROUND

Automatic transmission fluid serves many functions in a modern automatic transmission. Pressurized fluid may be used to engage friction clutches in order to establish a power flow path with a desired speed ratio. Fluid lubricates gears and bearings. Excess heat is removed by fluid flowing over various components. When the fluid contains contaminants, it may be less effective in these functions and may cause failures such as stuck valves. Therefore, transmissions often include fluid filters. The fluid typically drains to a sump due to gravity. A transmission pump draws fluid from the sump and delivers pressurized fluid to a valve body, which distributes the fluid to various places within the transmission at pressures appropriate to the various functions.

SUMMARY OF THE DISCLOSURE

A transmission includes a filter housing, a baffle, and a valve. The filter housing contains filter media and defines an inlet. The baffle defines front and rear openings. The baffle may be fixed to the filter housing. The valve is located within the baffle. The baffle may include a front bulkhead between the front opening and the inlet and a rear bulkhead between the rear opening and the inlet. The valve is configured to prevent air ingestion into the inlet. Specifically, the valve prevents flow from the front opening to the inlet in response to weight of fluid on a front side of the valve when the front opening is elevated relative to the rear opening. The valve also prevents flow from the rear opening to the inlet in response to weight of fluid on a rear side of the valve when the rear opening is elevated relative to the front opening. The valve may include a front plate and rear plate. The front plate may be located between the front opening and the front bulkhead. The rear plate may be located between the rear opening and the rear bulkhead. The front and rear plates may be supported to slide in unison in response to the weight of fluid on a higher side of the valve between a first position in which the front plate prevents flow through the front bulkhead and a second position in which the rear plate prevents flow through the rear bulkhead. The transmission may further include a gearbox, a valve body, and a pump.

A transmission filter includes a filter housing, a baffle, and a valve. The filter housing contains filter media and defines a central opening. The baffle is fixed to the filter housing around the central opening. The baffle defines front and rear openings. The baffle may include a front bulkhead between the front opening and the central opening and a rear bulkhead between the rear opening and the central opening. The valve, located within the baffle, is configured to alternately prevent flow from the front opening to the central opening and from the rear opening to the central opening in response to weight of fluid on a higher side of the valve. The valve may include front and rear plates. The front plate may be located between the front opening and the front bulkhead. The rear plate may be located between the rear opening and the rear bulkhead. The front and rear plates may be supported to slide in unison in response to the weight of fluid on the higher side of the valve between a first position in which the front plate prevents flow through the front bulkhead and a second position in which the rear plate prevents flow through the rear bulkhead.

A transmission filter includes a filter housing, a baffle, and a rear plate. The filter housing contains filter media and defines a central opening. The baffle is fixed to the filter housing around the central opening. The baffle defines front and rear openings and has a rear bulkhead between the rear opening and the central opening to permit fluid flow from the rear opening to the central opening. The rear plate is supported to slide toward the central opening when the rear opening is higher than the front opening in response to weight of fluid between the rear plate and the rear opening. In this position, the rear plate seals against the rear bulkhead to prevent flow from the rear opening to the central opening. The baffle may also include a front bulkhead located between the front opening and the central opening to permit fluid flow from the front opening to the central opening. A front plate may be supported to slide toward the central opening when the front opening is higher than the rear opening in response to weight of fluid between the front plate and the front opening. In this position, the front plate seals against the front bulkhead to prevent flow from the front opening to the central opening. The front plate and the rear plate may be linked to slide in unison such that flow is permitted from the rear opening to the central opening whenever flow is prevented from the front opening to the central opening and such that flow is permitted from the front opening to the central opening whenever flow is prevented from the rear opening to the central opening.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
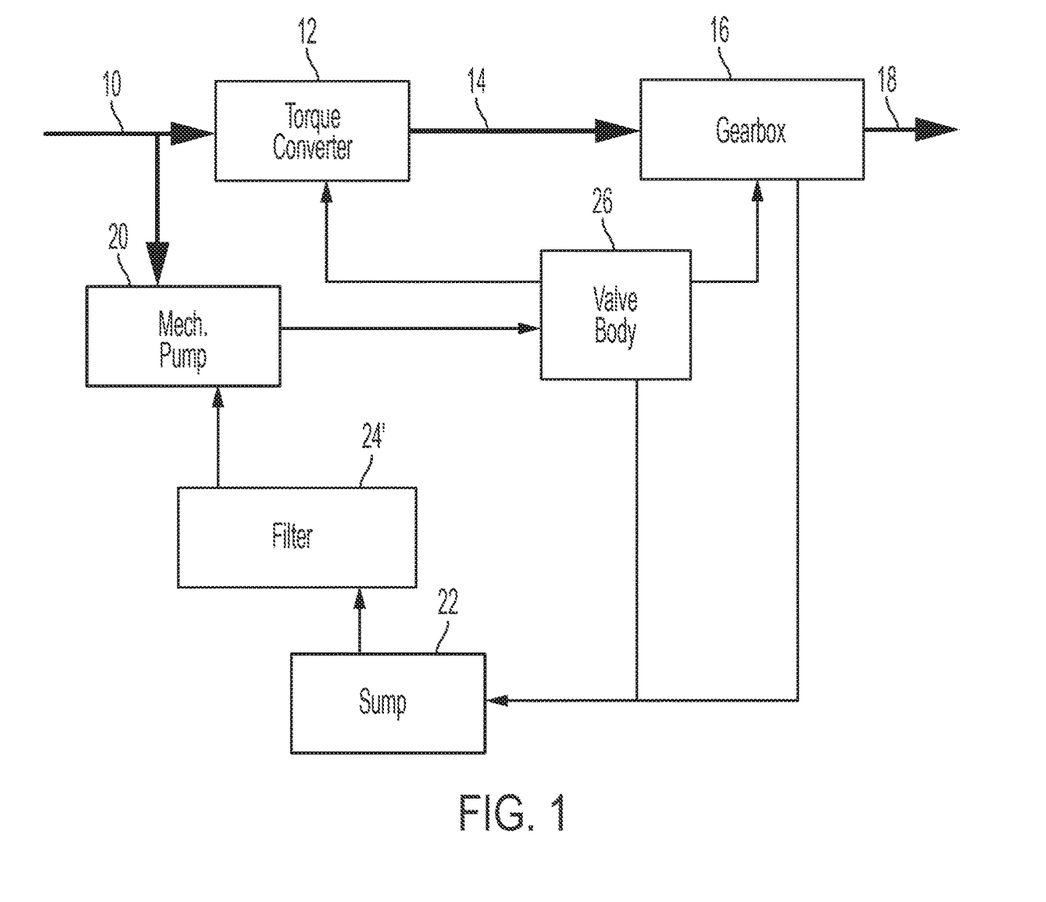
FIG. 1 is a schematic diagram of a transmission hydraulic system.

FIG. 1 schematically illustrates a transmission hydraulic system. Bold lines indicate mechanical power flow. Thin solid lines indicate flow of hydraulic fluid. Transmission input shaft 10 is connected to a power source such as a crankshaft of an internal combustion engine. Power is delivered to torque converter 12 which drives turbine shaft 14. Clutches within gearbox 16 are engaged to establish a power flow path from turbine shaft 14 to output shaft 18. Different power flow paths having different speed ratios may be established by engaging different clutches. In a rear wheel drive transmission, output shaft 18 is connected to a driveshaft which transmits the power to a rear differential and then to rear wheels. In a four wheel drive vehicle, a transfer case may be installed between the output shaft and the driveshaft to divert a portion of the power to a front differential and then to front wheels. In a front wheel drive vehicle, the output shaft may transmit power to a front differential via gears or a chain.

Some engine power is diverted to drive mechanical pump 20. Mechanical pump 20 draws fluid from sump 22, through filter 24, and delivers the fluid, at increased pressure, to valve body 26. The pressure at which fluid enters the valve body may be called line pressure. A network of control valves within the valve body deliver fluid to the torque converter and to gearbox components at desired pressures less than line pressure and at desired flow rates. Fluid drains from the control valves and from the gearbox back into sump 22.

Figure 2:
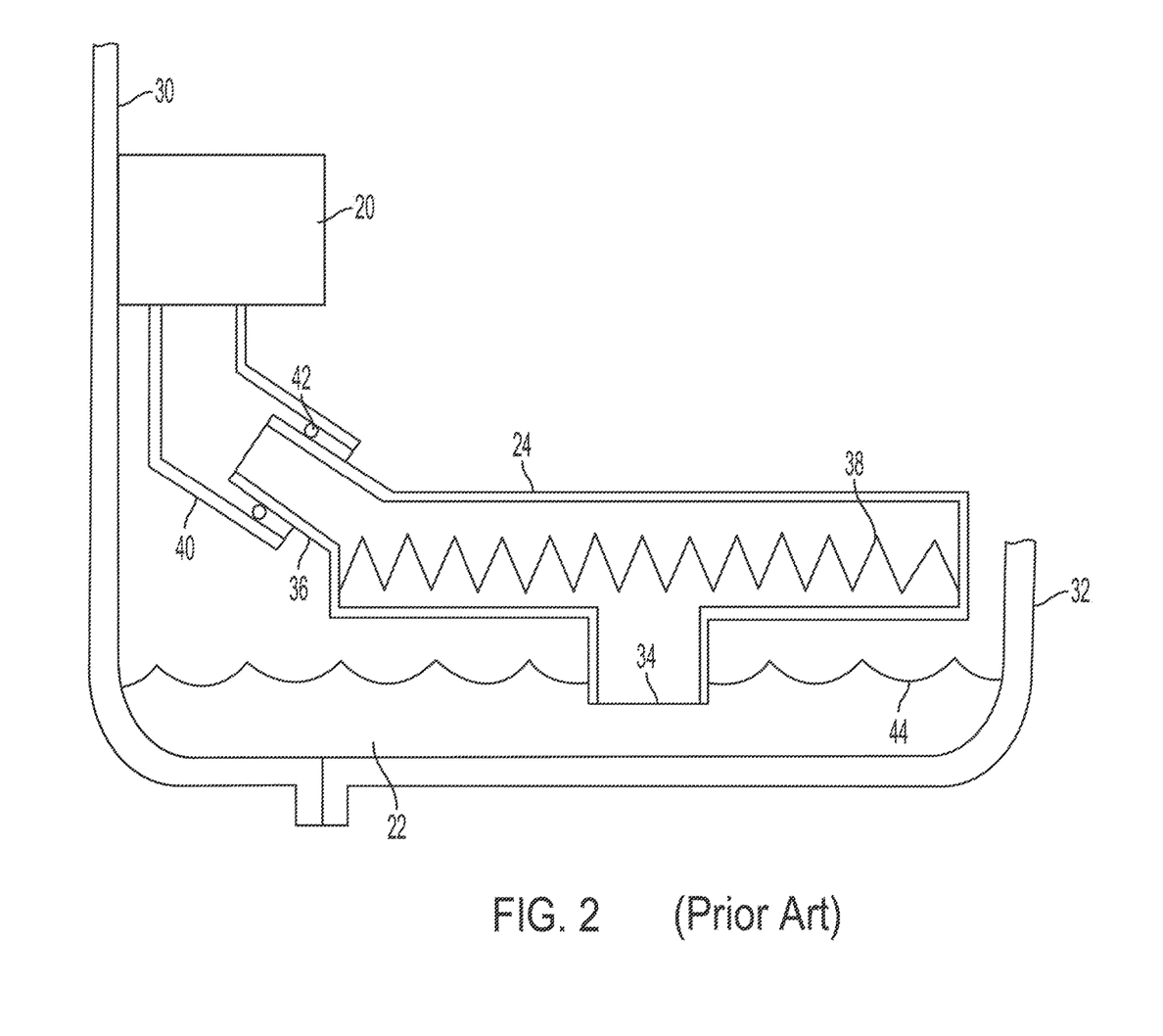
FIG. 2 is a cross sectional view of a first transmission filter system when a vehicle is on level ground at constant speed.

FIG. 2 is a cross section of a portion of a transmission assembly including pump 20, sump 22, and a first type of filter 24. Sump 22 is formed by joining together a front case half 30 and a rear case half 32. Pump 20 is supported by front case half 30. Filter 24 includes a single inlet 34 located near the center of the sump, an outlet tube 36, and filter media 38. Filter outlet tube 36 is sealed to pump inlet tube 40 by a seal 42. Fluid flows from the sump 22, through filter inlet port 34, through filter media 38, through filter outlet tube 36, through pump inlet tube 40, into pump 20. The height of the surface 44 of transmission fluid in the sump is determined by the quantity of fluid. The quantity must be sufficient to keep the inlet in fluid even when a substantial amount of fluid is either in the transmission components or draining back to the sump along the walls of the transmission case. When the fluid is cold, it can take a long time for fluid to drain back into the sump.

Figure 3:
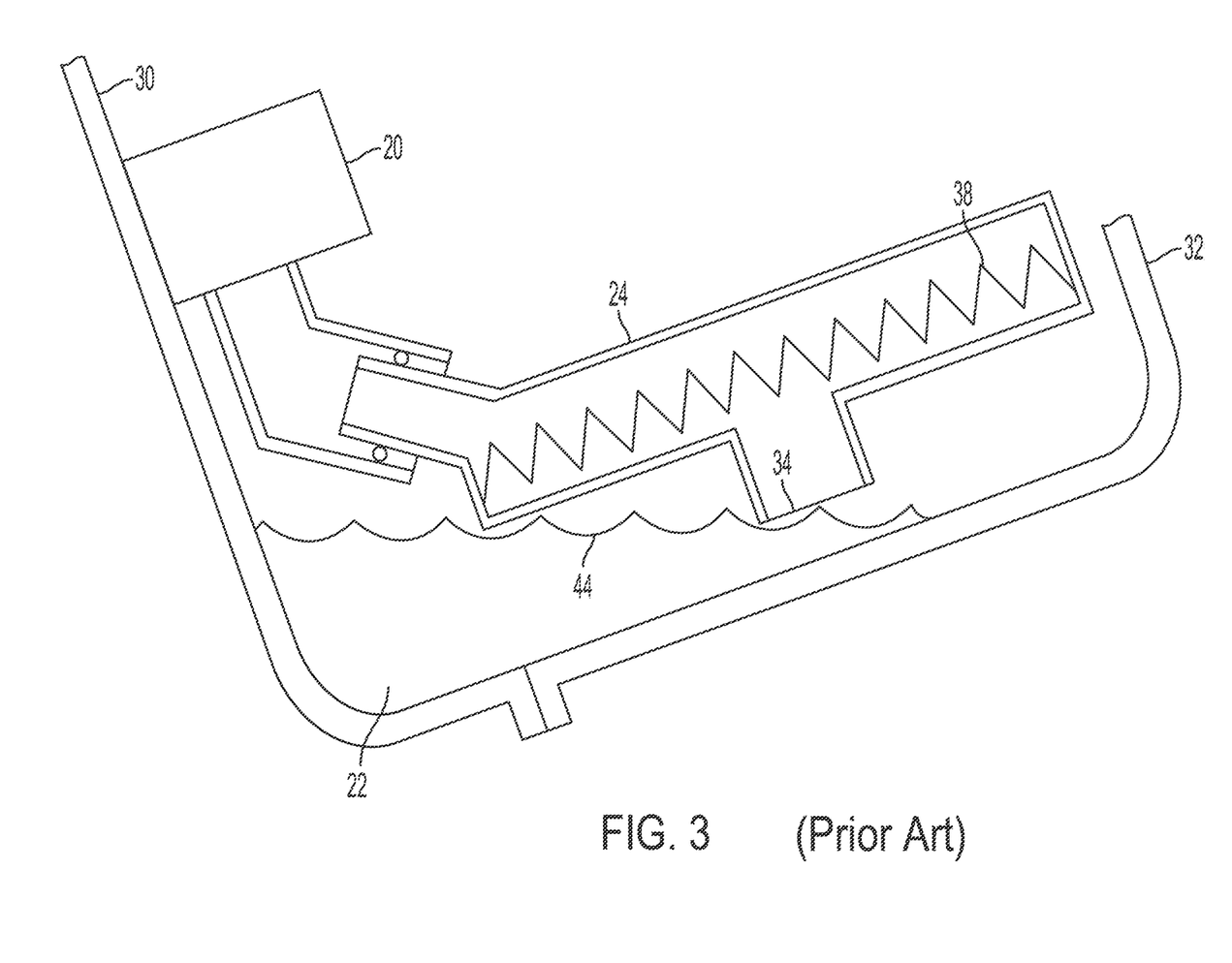
FIG. 3 is a cross sectional view of the first transmission filter system of FIG. 2 when the vehicle is decelerating or descending a grade.

FIG. 3 shows the filter of FIG. 2 when the vehicle is descending a hill. In this scenario, the fluid level becomes much deeper at the front of the sump and shallower in the vicinity of inlet 34. This can also happen when the vehicle decelerates rapidly on level terrain. If the inlet 34 is above the fluid surface 44, as shown in FIG. 3, then air is drawn into the filter instead of transmission fluid. Short periods of air ingestion may cause noise and/or unstable line pressure. Long periods of air ingestion would result in loss of ability to transmit power and potential damage to transmission components. To avoid air ingestion, the quantity of fluid in the transmission may be increased. However, if the fluid surface 44 is too high, rotating transmission components may splash into the fluid causing parasitic drag. It may be impossible to find a fluid quantity that avoids air ingestion in the worst case low level condition and also avoids high parasitic losses in other conditions.

Figure 4:
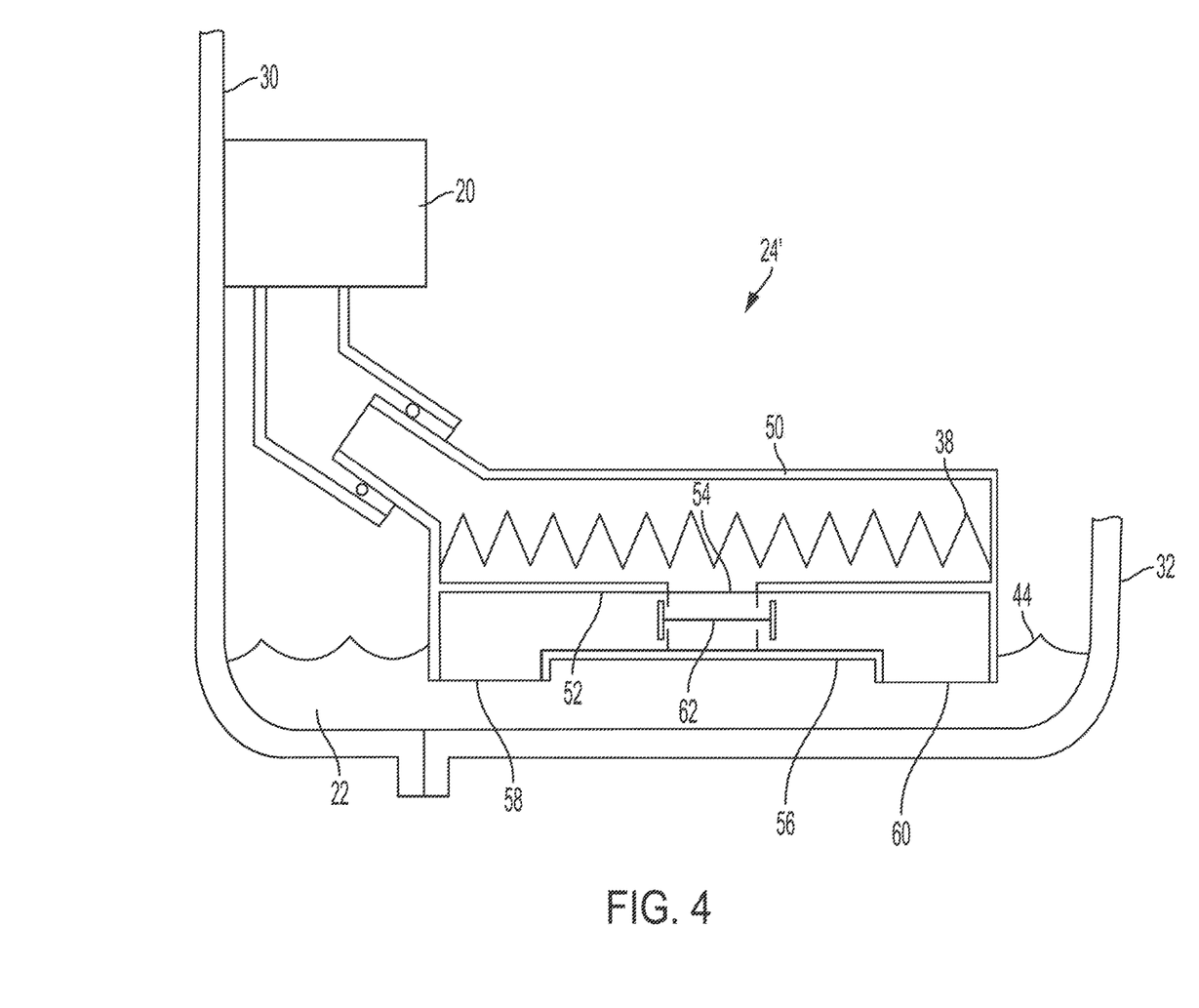
FIG. 4 is a cross sectional view of a second transmission filter system when a vehicle is on level ground at constant speed.

FIG. 4 illustrates a second type of transmission filter designed to avoid the air ingestion issue. Filter 24' includes a housing filled with filter media 38. The housing may be formed by a top piece 50 and a bottom piece 52 that are fused together after installing the filter media. The bottom piece 52 defines an inlet opening 54 to admit transmission fluid to the housing. The inlet opening is centrally located within the filter housing and may be called a central opening. A baffle 56 is fixed to the bottom piece 52. The baffle defines a front opening 58 and a rear opening 60. A valve assembly 62 is located within the channel formed by the baffle 56 and the bottom piece 52. The valve A assembly selectively seals off the channel between the front opening 58 and the inlet opening 54 or between the rear opening 60 and the inlet opening. The valve may have a central position, as shown in FIG. 4, in which fluid may flow from both the front opening and the rear opening to the inlet opening.

Figure 5:
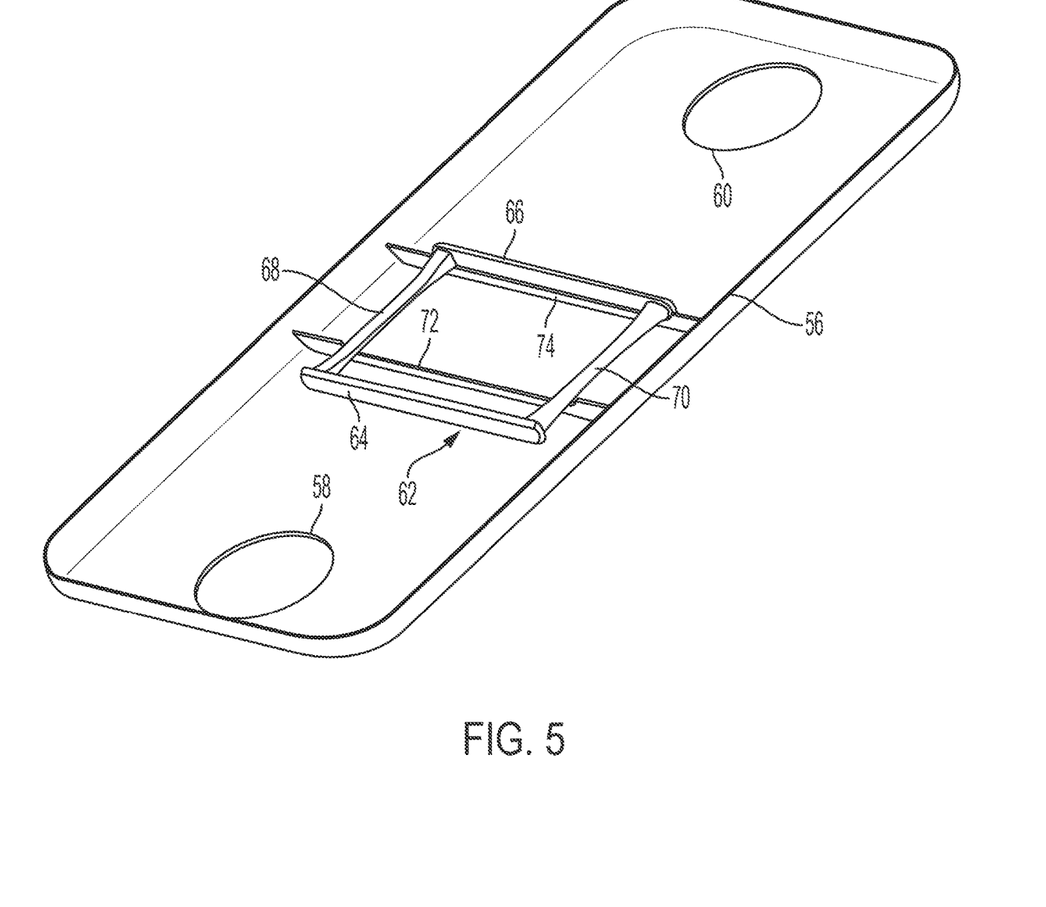
FIG. 5 is a pictorial view of a baffle and slider mechanism of the second transmission filter system of FIG. 4.

FIG. 5 illustrates the structure of valve 62. A slider includes a front plate 64 and a rear plate 66 connected by rails 68 and 70. The baffle includes two bulkheads 72 and 74. A top edge of front bulkhead 72 seals against the bottom of bottom piece 52 between the front opening 58 and the central opening 54. Fluid flowing from front opening 58 to central opening 54 must pass through an opening in bulkhead 72. Similarly, a top edge of rear bulkhead 74 seals against the bottom of bottom piece 52 between the rear opening 60 and the central opening 54. Fluid flowing from rear opening 60 to central opening 54 must pass through an opening in bulkhead 74. For clarity, the top portions of the bulkheads are not shown in FIG. 5. The rails 68 and 70 pass through the openings of the bulkheads.

When the rear opening is higher than the front opening, the weight of fluid between the rear opening 60 and the rear plate 66 cause the slider to move to the position shown in FIG. 5. In this position, rear plate 66 seals the opening in rear bulkhead 74, preventing the flow of fluid or air from the rear opening 60 to the central opening 54. Thus, in this condition the filter draws fluid exclusively from the lower front opening.

Figure 6:
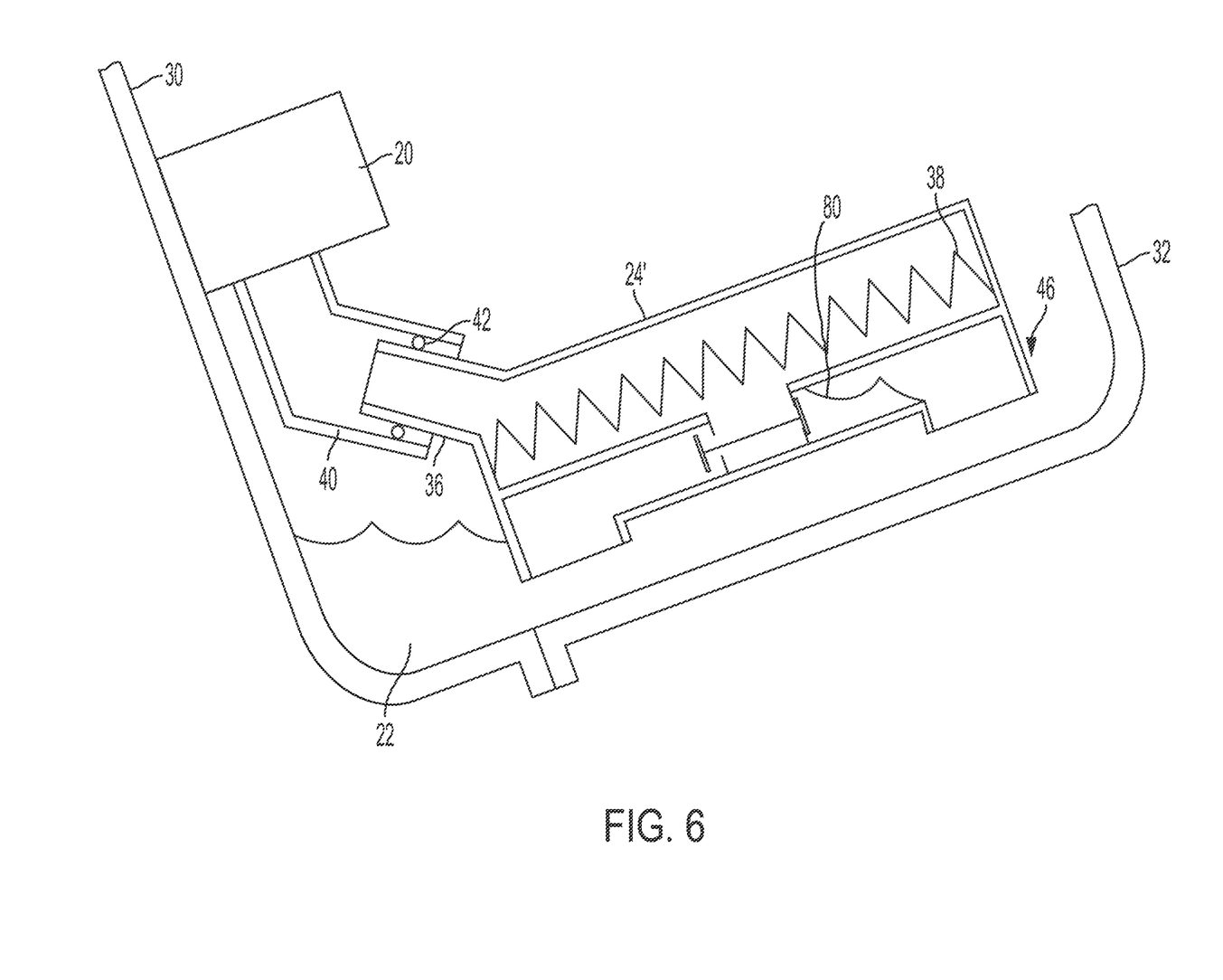
FIG. 6 is a cross sectional view of the second transmission filter system of FIG. 4 when the vehicle is decelerating or descending a grade.

FIG. 6 shows the transmission of FIG. 4 when the vehicle is on a downhill slope. The same phenomena occur when the vehicle is decelerating on level ground. Note that the fluid in sump 22 has moved to the front of the sump. Although front opening 58 is still submerged, rear opening 60 is above the surface 46. A quantity of transmission fluid 80 is trapped by baffle 56 behind the rear bulkhead 74. The weight of the fluid 80 causes valve 62 to close the opening in the rear bulkhead. Therefore, air is not ingested into the filter media and valve body. Fluid is drawn through the front opening 58, through the opening in the front bulkhead 72, through the filter media 38 and into the valve body.

Figure 7:
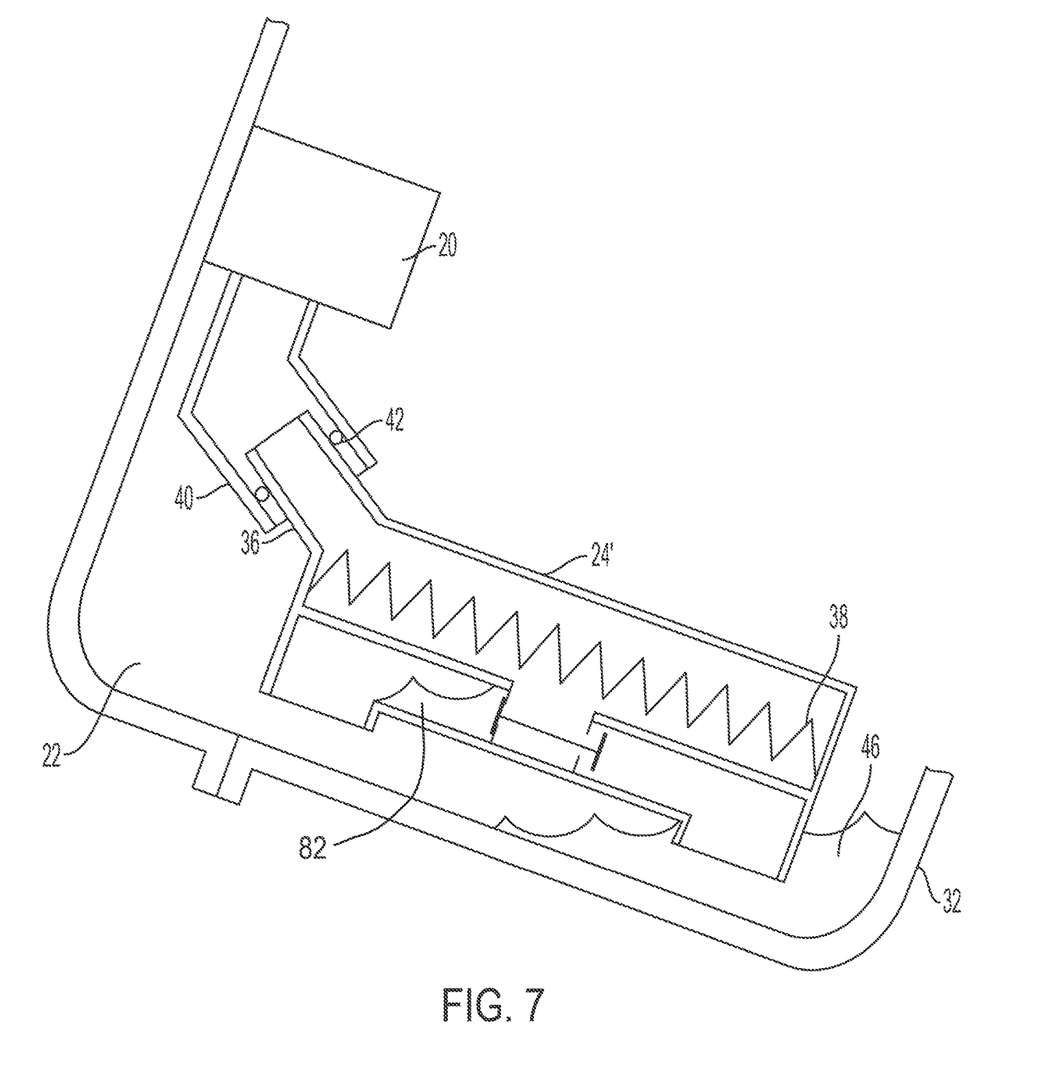
FIG. 7 is a cross sectional view of the second transmission filter system of FIG. 4 when the vehicle is accelerating or ascending a grade.

Similarly, FIG. 7 shows the transmission of FIG. 4 when the vehicle is on an uphill slope. The same phenomena occur when the vehicle is accelerating on level ground. The fluid in sump 22 has moved to the back of the sump. Front opening 58 is now above the surface 46 while rear opening 60 is submerged. A quantity of transmission fluid 82 is trapped by baffle 56 in front of the front bulkhead 72. The weight of the fluid 82 causes valve 62 to close the opening in the front bulkhead. Therefore, air is not ingested into the filter media and valve body. Fluid is drawn through the rear opening 60, through the opening in the rear bulkhead 74, through the filter media 38 and into the valve body.

With the filter design of FIGS. 4-7, the minimum fluid level can be lower while still preventing air ingestion when the vehicle is accelerating or decelerating or climbing or descending a grade. The average and maximum fluid levels are directly related to the minimum fluid level. Therefore, the frequency of the fluid level being high enough that rotating parts contact the surface, causing parasitic drag, is reduced.

Figure 8:
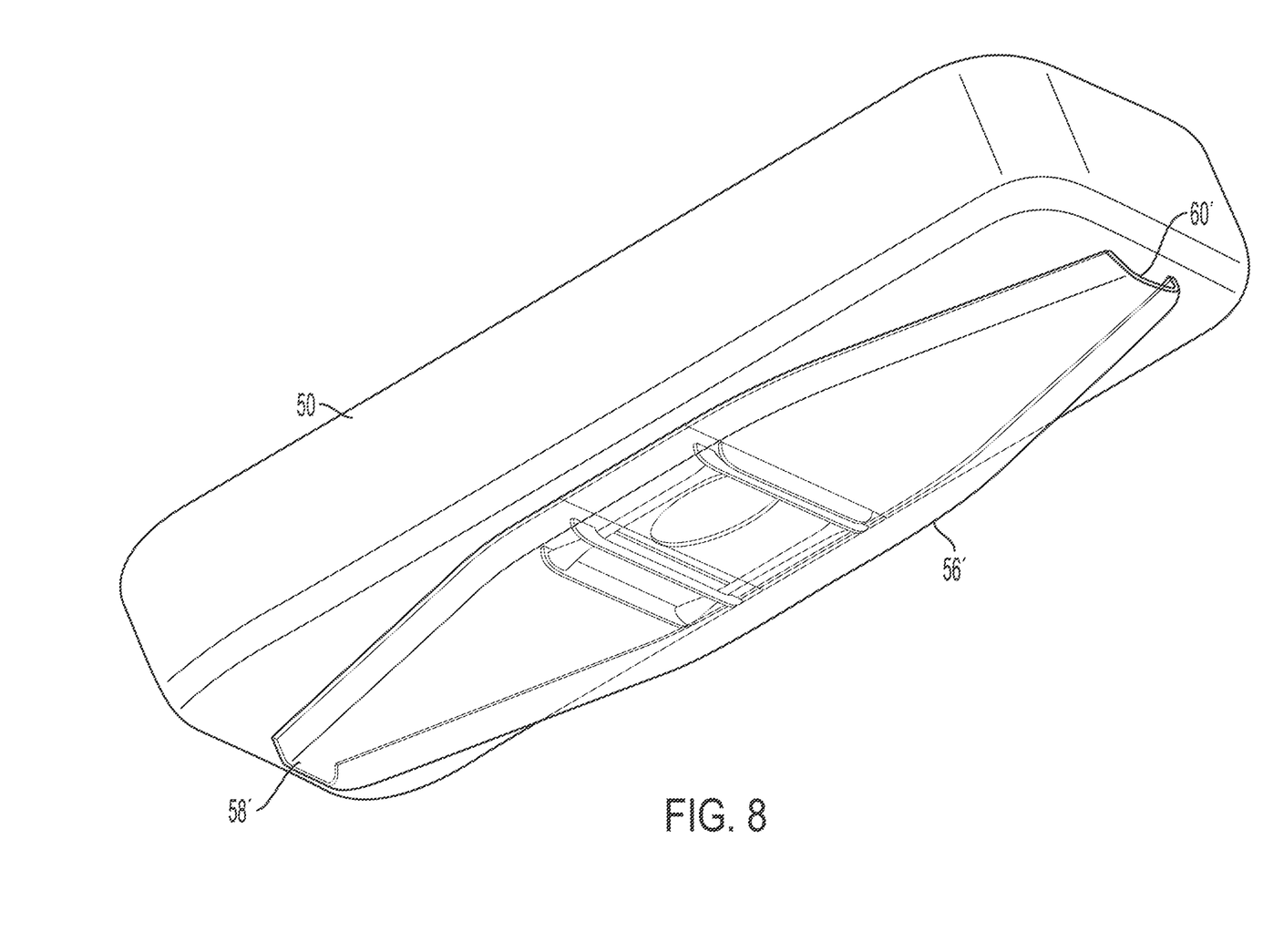
FIG. 8 is a pictorial view of a third transmission filter system.

FIG. 8 illustrates an alternate embodiment of the filter assembly. In the embodiment of FIG. 8, baffle 56' is tapered such that it is narrower at the ends than adjacent to the inlet. Front and rear openings 58' and 60' are each defined partially by an edge of the baffle and partially by a bottom of filter housing 50. The front and rear openings face axially as opposed to facing downward. The inventors have found that this embodiment can be positioned closer to the bottom of the transmission sump than the embodiment of FIG. 4-7. Furthermore, the inventors have discovered that this embodiment is less likely to trap air in one end of the baffle as that end transitions from being high to being low.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    a filter housing containing filter media and defining an inlet;
    a baffle defining front and rear openings; and
    a valve within the baffle configured to prevent flow from the front opening to the inlet in response to weight of fluid on a front side of the valve when the front opening is elevated relative to the rear opening and to prevent flow from the rear opening to the inlet in response to weight of fluid on a rear side of the valve when the rear opening is elevated relative to the front opening to prevent air ingestion into the inlet.

2. The transmission of claim 1 further comprising:
    a gearbox;
    a valve body configured to distribute fluid to the gearbox; and
    a pump configured to draw fluid from a sump, through the filter media, and supply the fluid to the valve body.

3. The transmission of claim 1 wherein the baffle is fixed to the filter housing.

4. The transmission of claim 3 wherein the baffle comprises a front bulkhead between the front opening and the inlet and a rear bulkhead between the rear opening and the inlet.

5. The transmission of claim 4 wherein the valve comprises:
    a front plate between the front opening and the front bulkhead; and
    a rear plate between the rear opening and the rear bulkhead wherein the front and rear plates are supported to slide in unison in response to the weight of fluid on a higher side of the valve between a first position in which the front plate prevents flow through the front bulkhead and a second position in which the rear plate prevents flow through the rear bulkhead.

6. A transmission filter comprising:
    a filter housing containing filter media and defining a central opening;
    a baffle fixed to the filter housing around the central opening, the baffle defining front and rear openings; and
    a valve within the baffle configured to alternately prevent flow from the front opening to the central opening and from the rear opening to the central opening in response to weight of fluid on a higher side of the valve.

7. The transmission filter of claim 6 wherein the baffle comprises a front bulkhead between the front opening and the central opening and a rear bulkhead between the rear opening and the central opening.

8. The transmission filter of claim 7 wherein the valve comprises:
    a front plate between the front opening and the front bulkhead; and
    a rear plate between the rear opening and the rear bulkhead wherein the front and rear plates are supported to slide in unison in response to the weight of fluid on the higher side of the valve between a first position in which the front plate prevents flow through the front bulkhead and a second position in which the rear plate prevents flow through the rear bulkhead.

9. A transmission filter comprising:
    a filter housing containing filter media and defining a central opening;
    a baffle fixed to the filter housing around the central opening, the baffle defining front and rear openings and having a rear bulkhead between the rear opening and the central opening configured to permit fluid flow from the rear opening to the central opening; and
    a rear plate supported to slide toward the central opening when the rear opening is higher than the front opening in response to weight of fluid between the rear plate and the rear opening such that the rear plate seals against the rear bulkhead to prevent flow from the rear opening to the central opening.

10. The transmission filter of claim 9 wherein the baffle further comprises a front bulkhead between the front opening and the central opening configured to permit fluid flow from the front opening to the central opening.

11. The transmission filter of claim 10 further comprising a front plate supported to slide toward the central opening when the front opening is higher than the rear opening in response to weight of fluid between the front plate and the front opening such that the front plate seals against the front bulkhead to prevent flow from the front opening to the central opening.

12. The transmission filter of claim 11 wherein the front plate and the rear plate are linked to slide in unison such that flow is permitted from the rear opening to the central opening whenever flow is prevented from the front opening to the central opening and such that flow is permitted from the front opening to the central opening whenever flow is prevented from the rear opening to the central opening.

\* \* \* \* \*